United States Patent [19]
Chen

[11] Patent Number: 5,499,699
[45] Date of Patent: Mar. 19, 1996

[54] DEVICE FOR LOCATING REINFORCING PLATE OF BICYCLE BRAKE

[76] Inventor: Tse-Min Chen, P.O. Box 1750, Taichung, Taiwan

[21] Appl. No.: 217,650

[22] Filed: Mar. 25, 1994

[51] Int. Cl.[6] ........................................................ B62L 1/14
[52] U.S. Cl. ........................................ 188/24.21; 188/24.11
[58] Field of Search ................................ 188/24.21, 24.11

[56] References Cited

U.S. PATENT DOCUMENTS 5,293,965  3/1994  Nagano .................................. 188/24.21

FOREIGN PATENT DOCUMENTS 299809  1/1989  European Pat. Off. ............ 188/24.21

Primary Examiner—Matthew C. Graham

[57] ABSTRACT

An apparatus for locating the reinforcing plate of a bicycle braking system comprises one upper locating device and two lower support rods. The upper locating device is used to locate the upper portion of the reinforcing plate and is made up of one support shaft, two fastening bolts and one rotary nut. The rotary nut can be turned on the support shaft to adjust the distance between the reinforcing plate and a bicycle fork tube sleeve to which the support shaft is fastened.

1 Claim, 4 Drawing Sheets

5,499,699

DEVICE FOR LOCATING REINFORCING PLATE OF BICYCLE BRAKE

BACKGROUND OF THE INVENTION

The present invention relates generally to a bicycle brake, and more particularly to an apparatus for locating the reinforcing plate of a bicycle brake.

As shown in FIG. 4, a bicycle braking system of the prior art is provided with a pulling cable 1 fastened at one end thereof with the brake lever and at another end thereof with a connection element 11, which can be actuated by the brake lever to hoist the two brake cables 12 to trigger the braking action of two brake shoes 14 mounted respectively on two brake seats 13. In order to ensure a smooth and precise operation of the braking system of a bicycle on a bumpy road, the braking system is provided additionally with an inverted U-shaped reinforcing plate 16 having two ends fastened respectively to two shafts 151 which are in turn fastened to the fork tube of the bicycle frame. The reinforcing plate 16 is intended to prevent the two shafts 151 from being forced to slant outwards at such time when the two brake shoes 14 are at work; nevertheless the reinforcing plate 16 is fastened to the two shafts 151 in such a manner that the reinforcing plate 16 is vulnerable to becoming loosened, especially when the bicycle is ridden on a rough road. As shown in FIG. 4, the upper portion of the reinforcing plate 16 is not held by any supporting means.

SUMMARY OF THE INVENTION

It is therefore the primary objective of the present invention to provide the reinforcing plate of a bicycle braking system with a locating means capable of holding securely the reinforcing plate in conjunction with the two shafts similar in construction to those of the prior art described above.

In keeping with the principle of the present invention, the foregoing objective of the present invention is attained by one upper locating means and two lower support rods. The present invention is characterized in that the upper locating means is used to locate the upper portion of the reinforcing plate and is made up of a support shaft, two fastening bolts and a rotary nut. The rotary nut can be turned on the support shaft to adjust the distance between the reinforcing plate and a bicycle fork tube sleeve.

DETAILED DESCRIPTION OF THE INVENTION

Figure 1:
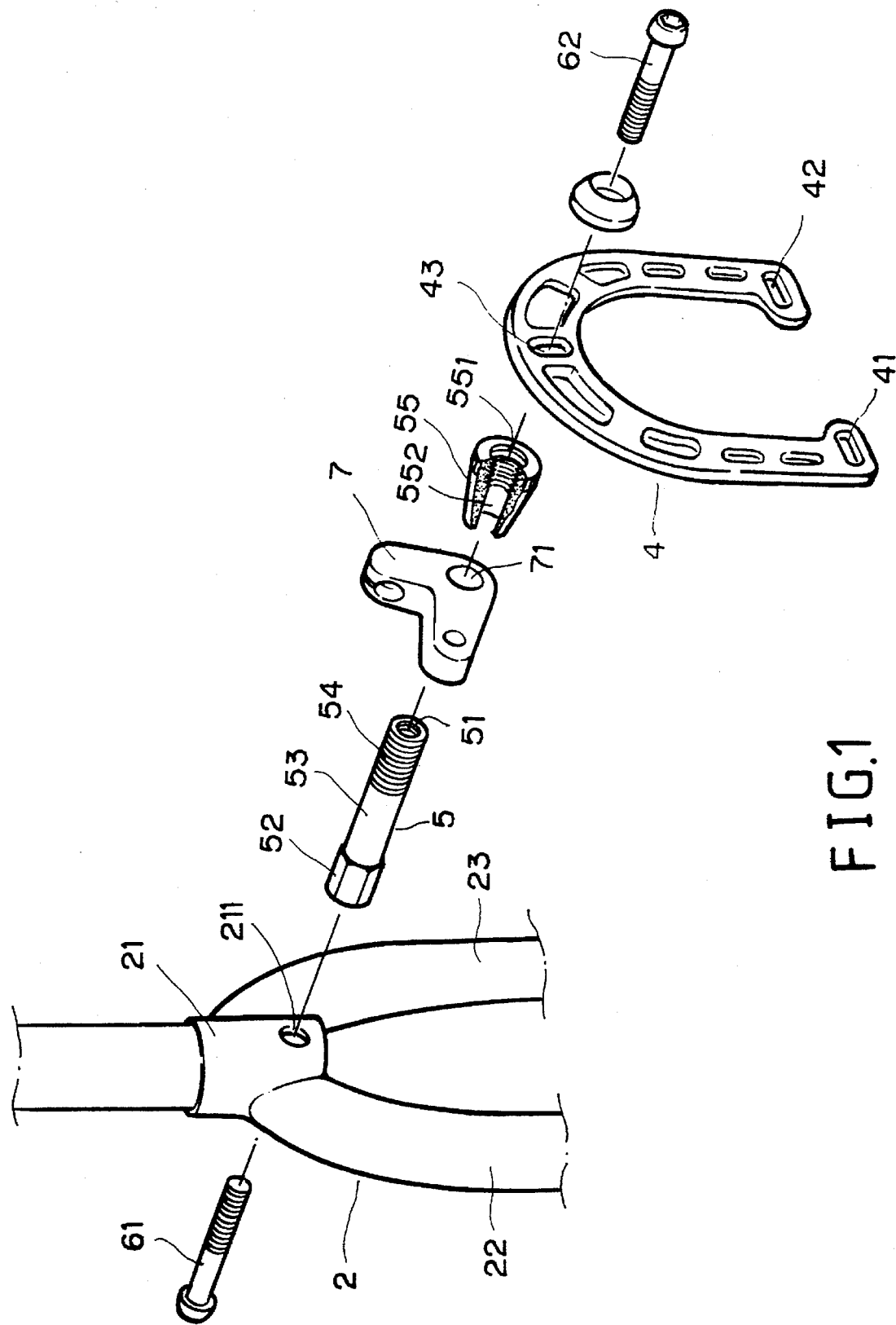
FIG. 1 shows an exploded view of the present invention.
Figure 2:
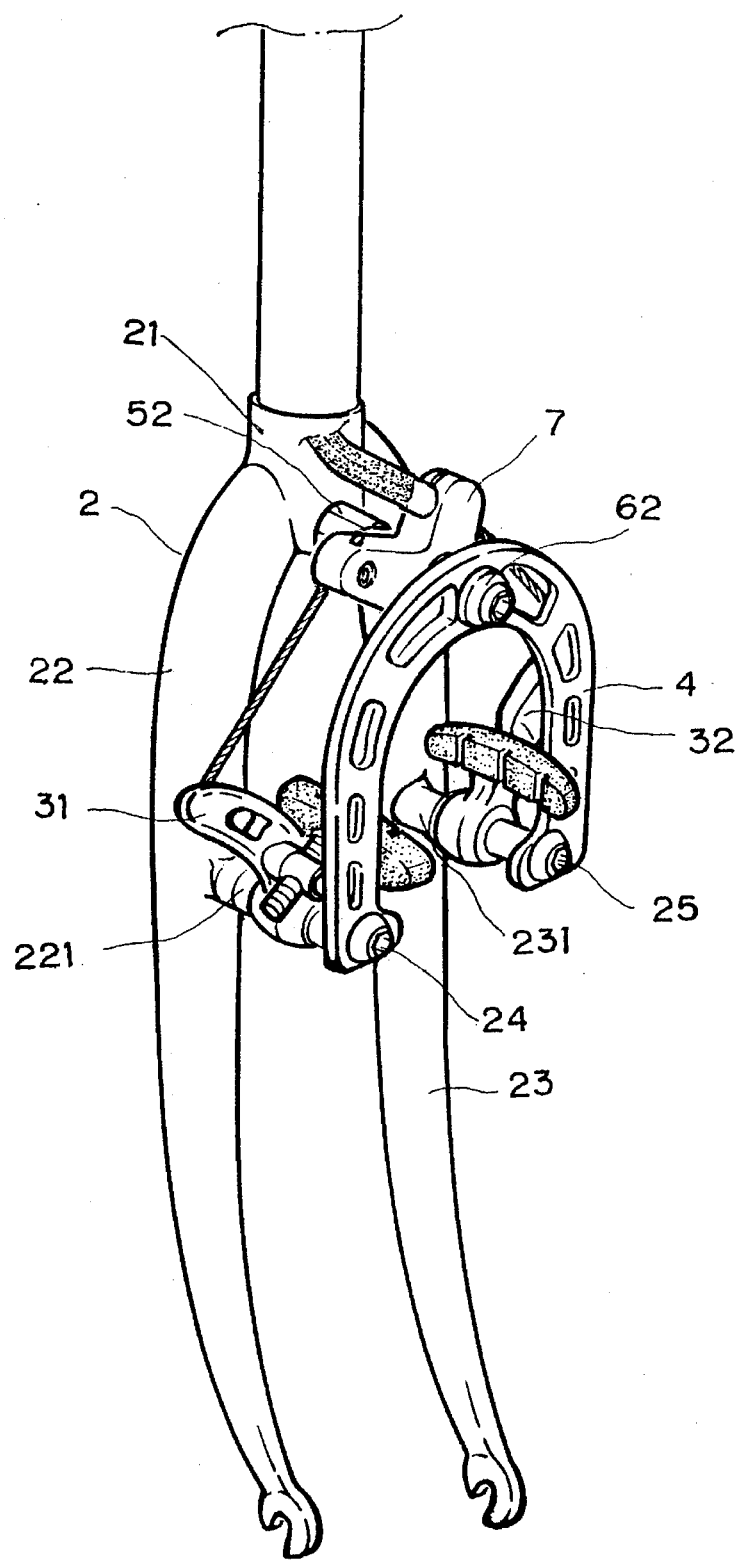
FIG. 2 shows a schematic view of the present invention in combination.
Figure 3:
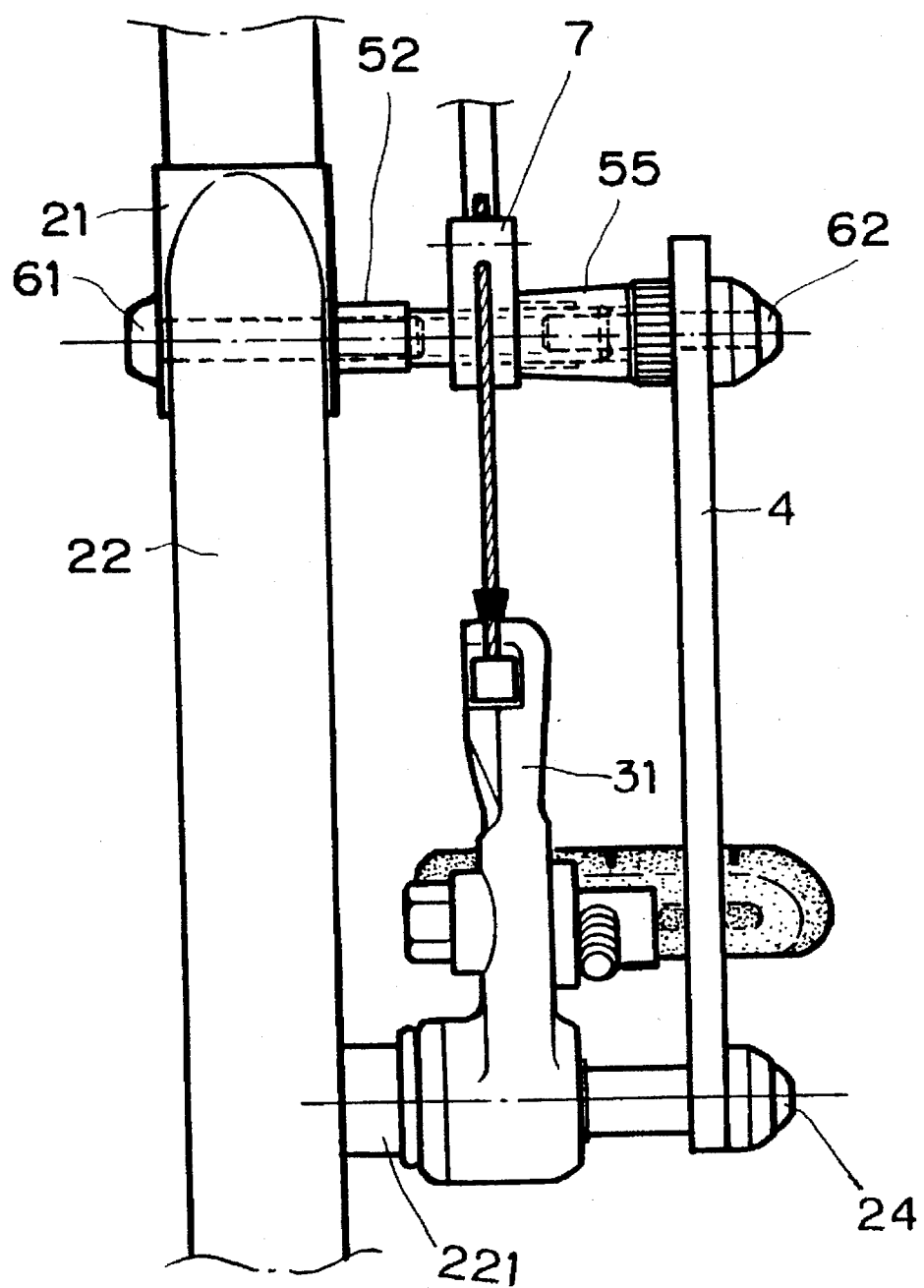
FIG. 3 shows a side elevational view of the present invention.
Figure 4:
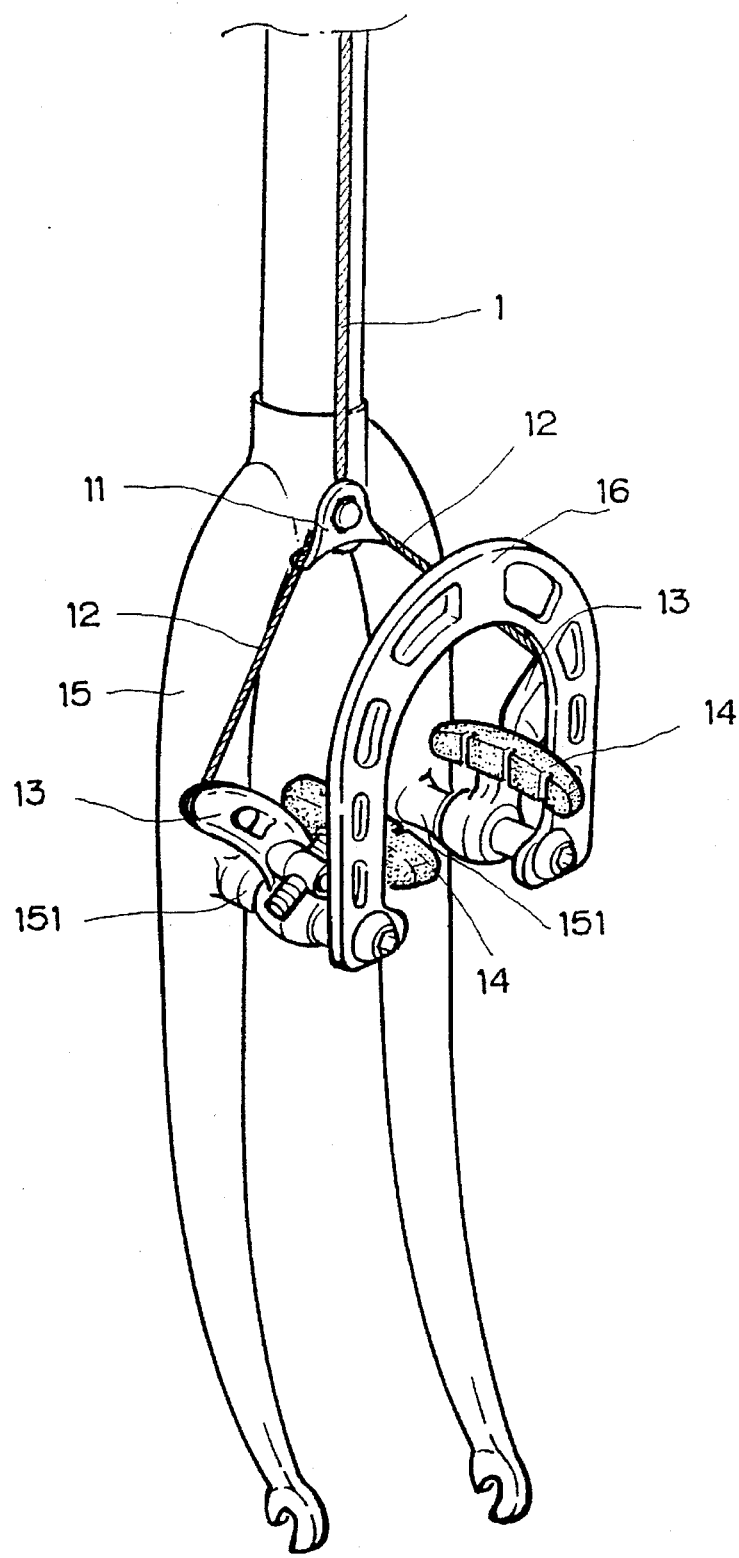
FIG. 4 shows a perspective view of the prior art in combination.

As shown in FIGS. 1, 2 and 3, the present invention comprises an inverted U-shaped reinforcing plate 4, two lower support rods 221 and 231, and one upper support rod 5.

The reinforcing plate 4 has two lower fastening holes 41 and 42, which are located at both ends of the two arms of the reinforcing plate 4. In addition, the reinforcing plate 4 has an upper fastening hole 43 located in the middle of the upper portion thereof.

Both ends of the reinforcing plate 4 are located by the two lower support rods 221 and 231, which engage respectively with the two lower fastening holes 41 and 42 of the reinforcing plate 4, in a manner similar to that of the prior art described above.

The present invention is characterized in that the reinforcing plate 4 is located additionally by an upper support rod 5, which is provided therein axially with a threaded through hole 51 and a hexagonal head 52, as shown in FIG. 1. The threaded through hole 51 of the upper support rod 5 is engageable with two fastening bolts 61 and 62. The fastening bolt 61 is received in an axial hole 211 of a sleeve 21 while the fastening bolt 62 is received in the upper fastening hole 43 of the reinforcing plate 4.

The upper support rod 5 is further provided with a male threaded portion 54 located at the posterior end thereof, and with a smooth portion 53 located between the hexagonal head 52 and the male threaded portion 54 for engaging the base hole 71 of a brake cable hoisting seat 7. The male threaded portion 54 of the upper support rod 5 is engageable with the female threaded hole 551 of a rotary nut 55.

The distance between the sleeve 21 and the reinforcing plate 4 can be adjusted appropriately by rotating the rotary nut 55.

As shown in FIG. 2, the reinforcing plate 4 of the present invention is located securely at three points by means of three support rods. As a result, the reinforcing plate 4 is securely located even at such time when the bicycle is ridden on a rough road.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A locating device of a reinforcing plate of a bicycle braking system comprising an upper locating means and two lower support rods, with said upper locating means being intended for locating an upper portion of an inverted U-shaped reinforcing plate of a bicycle braking system, and with said two lower support rods being intended for locating both lower ends of said U-shaped reinforcing plate of said bicycle braking system;

wherein said upper locating means comprises:

a support rod provided therein axially with a threaded through hole which has one end engageable with a fastening bolt and another end engageable with another fastening bolt for fastening securely said support rod to a sleeve of a bicycle fork tube, said support rod further provided with a hexagonal head, a male threaded portion opposite in location to said hexagonal head, and a smooth portion which is located between said hexagonal head and said male threaded portion and is engageable with a base hole of a bicycle brake cable hoisting seat; and a rotary nut having therein axially a female threaded hole which is engageable with said male threaded portion of said support rod such that said rotary nut can be so rotated on said male threaded portion of said support rod as to adjust the distance between said U-shaped reinforcing plate and said sleeve of said bicycle fork tube.

* * * * *